ated-cone portion
UNITED STATES PATENT OFFICE.

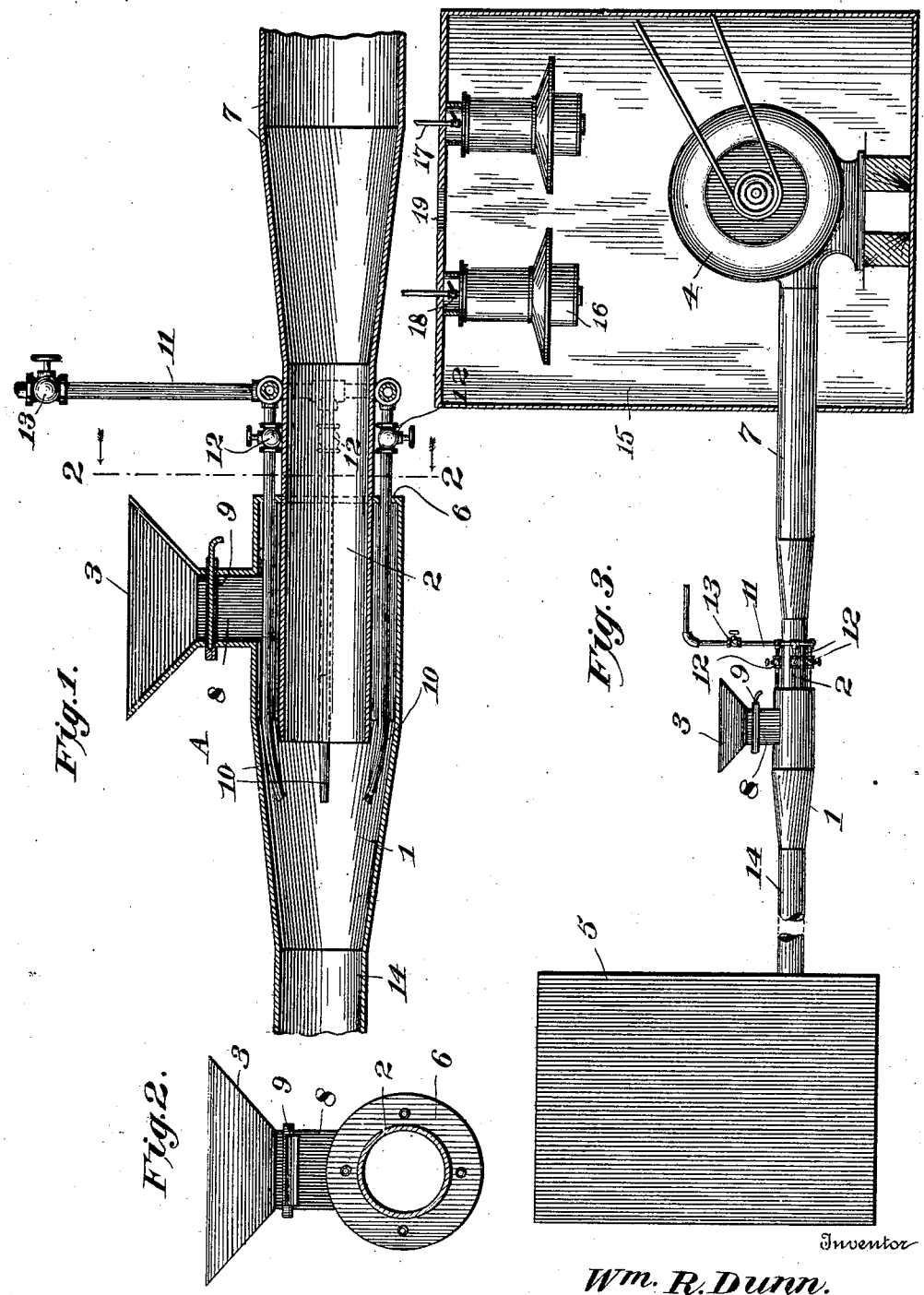

WILLIAM R. DUNN, OF EASTON, PENNSYLVANIA.

APPARATUS FOR HANDLING GROUND FINISHED CEMENT.

SPECIFICATION forming part of Letters Patent No. 669,409, dated March 5, 1901.

Application filed November 14, 1900. Serial No. 36,508. (No model.)

*To all whom it may concern:*

Be it known that I, WILLIAM R. DUNN, a citizen of the United States, residing at Easton, in the county of Northampton and State of Pennsylvania, have invented certain new and useful Improvements in Apparatus for Handling Ground Finished Cement; and I do hereby declare the following to be a full, clear, and exact description of the invention, such as will enable others skilled in the art to which it appertains to make and use the same.

This invention relates to improvements in apparatus for handling ground finished cement; and it has for its object to provide a means for conveying, cooling, and hydrating burnt and finely-ground argillaceous and calcite limestone, and also clay and calcareous earths, such as are commonly known as "Portland" cement.

The invention consists in a truncated cone having a blast-nozzle extending into the same and adapted to deliver a blast of moistened or unmoistened air and means for delivering the finished cement into the said cone, so that it will be drawn forward therein by the blast and forced into any suitable receptacle, the blast operating to cool and hydrate the material acted upon.

It further consists in certain other novel constructions, combinations, and arrangements of parts, as will be hereinafter fully described and claimed.

In the accompanying drawings, Figure 1 represents a longitudinal vertical section through a cement-handling conveyer constructed in accordance with the present invention. Fig. 2 is a cross-section of the same upon the line 2 2 of Fig. 1. Fig. 3 is a side elevation of the conveyer, showing the manner of connecting the same with an air-blast mechanism and a receiving chamber or receptacle.

1 in the drawings represents a truncated cone; 2, a blast-nozzle extending into the same; 3, a hopper for delivering material to the cone; 4, a blast mechanism or blower, and 5 a receptacle for receiving the material conveyed.

The apparatus comprising the present invention is so arranged as to be adapted to receive and convey to the proper point ground finished cement, and is provided with means whereby the condition of the cement may be varied as desired—that is, it may be more or less moistened and cooled, the degree of such cooling and hydrating operation being entirely within the control of the operator of the apparatus. The truncated-cone portion 1 of the apparatus is preferably enlarged toward the end, into which the blast-nozzle 2 is inserted. The rear end of the cone-casing may be made cylindrical, if desired, and may be partially closed at its end, as at 6. The end 6, however, is provided with a central aperture through which the nozzle 2 is inserted, the said nozzle being tightly fitted in the said opening. The nozzle 2 is preferably cylindrical and is secured at its rear end to a blast-pipe 7, which is connected with the blower 4 and adapted to receive a blast therefrom. The end of the nozzle 2, which enters the cone 1, is of course open to admit the blast to the cone 1.

Near the rear end of the cone-casing and in the upper portion thereof is formed an inlet pipe or tubing, as 8, which is provided at its upper end with a hopper 3 for receiving the cement or other material which is to be fed to the cone. The tube 8 is preferably provided with a slide or gate 9, by which the said tube can be closed to shut off the flow of cement or other ground material from the hopper. By regulating the gate 9 the amount of material permitted to flow into the cone-chamber can be regulated at will. In order to introduce air or steam under pressure into the cone, a series of pipes forming nozzles, as 10 10, are admitted into the cone-chamber through the rear end thereof, their forward open ends extending into the cone preferably a slight distance beyond the open end of the blast-nozzle 2. The outer ends of these pipe-nozzles 10 are connected with a supply-pipe 11, and each one of the said nozzle-pipes 10 is preferably provided with its own controlling-cock, as 12, so that any one or all of the nozzles may be closed or opened, as desired, without affecting any of the others. The supply-pipe 11 is also provided with a valve or cock 13.

The truncated-cone chamber 1 at its reduced end joins a delivery or conveying pipe 14, which leads into any suitable receiving or collecting chamber, as 5.

In using this apparatus for cooling, hydrating, and conveying burnt and finely-ground materials, such as Portland cement, a low-pressure blast is introduced into the cone-chamber through the blast-pipe 2 by means of a blower, as 4, which is operated in any usual and suitable manner. The blast of air thus introduced into the conveying-cone may be moistened or unmoistened, as desired. For this purpose the blower 4 is preferably inclosed in a casing, as 15, which is provided with suitable humidifiers or moistening devices, as 16 16, which are connected with a water-supply by pipes 17 17. By the use of valves or cocks 18 in said pipes the amount of moisture given out to the air in the chamber 15 can be easily regulated. The casing 15 is formed with one or more apertures, as at 19, for supplying air to the same. By suitably moistening the air thus forced into the cone-chamber the cement may be properly hydrated. If it is desired also to employ a high-pressure blast, such blast may be supplied through the nozzles 10 10 by forcing either steam or air through the same at a suitable pressure. It will thus be seen that a blast under low pressure may be used in this apparatus for conveying the material, or a blast under high pressure may be employed through the nozzles 10 10, or both a low and high pressure blast may be supplied at the same time. The high velocity of the air passing through the truncated cone forms a suction in the rear end thereof, which draws in all the finely-ground materials or cement, which are permitted to pass the gate 9 and forces the same along with the blast through the pipe 14 into the collecting-chamber. All the material which enters the cone-chamber from the hopper is free to pass around the nozzle 2 of the blast-pipe, and will then be drawn forward and delivered through the cone 1 into the said pipe 14, a sufficient amount of air entering the open hopper to facilitate such an action. If desired, also one or more of the nozzles 10 may be removed, so as to admit air through the apertures which the said nozzle or nozzles occupy.

As above stated, one or more of the nozzles 10 may be employed without affecting the others by using the valves or cocks 12. It will be evident from the above description that an apparatus of this kind may be employed for conveying all sorts of burnt or finely-ground materials, whether of limestone, clay, or other earths, and that it may be hydrated to any desired extent and cooled to any desired degree, all within the easy control of the operator.

By the method of mixing the air and cement hereinbefore described the hydration takes place much more quickly than in the methods in common vogue. It is usual now to store the cement in bins when hot. By my invention the cement mixed with air will be delivered to the bins cold, which is an important advantage in the handling of the same.

Having thus described the invention, what I claim as new, and desire to secure by Letters Patent, is—

1. A conveying apparatus, comprising a chamber reduced at its delivery end, blast mechanism extending into the said chamber at its enlarged end, a part of said blast mechanism being connected with one source of pressure and a part with another source of pressure, whereby either one or both of said blast mechanisms may be employed for introducing pressures of different degrees and means for delivering finely-ground materials to the said chamber to be acted upon by the blast, substantially as described.

2. A conveying apparatus, having a blast-chamber formed with a reduced delivery end, means for introducing blasts of different pressures simultaneously into said chamber at its enlarged end, and means for delivering finely-ground materials into the enlarged end of the blast-chamber, substantially as described.

3. An apparatus for conveying, cooling and hydrating burnt or finely-ground materials, comprising a cone-chamber, means for introducing a more or less moistened blast into said cone-chamber comprising a blast-nozzle extending into the enlarged end of the cone-chamber, said nozzle being connected with a blast mechanism, and means for delivering the ground material into the cone-chamber to the rear of the mouth of the nozzle, substantially as described.

4. An apparatus for conveying, cooling and hydrating finely-ground materials, comprising a cone-chamber, means for delivering a low and a high blast into said cone-chamber, comprising a nozzle entering the cone-chamber from the rear and connected with a mechanism for producing a blast of comparatively low pressure, and a series of nozzles also entering the rear end of the cone-chamber and connected with means for producing a blast of comparatively high pressure, and a hopper adapted to deliver material into the enlarged end of the cone-chamber, substantially as described.

5. An apparatus for conveying, cooling and hydrating cement or other finely-ground material, comprising a cone-chamber having a reduced end portion connected with a conveying-pipe, an enlarged end portion adapted to receive a blast-nozzle, a blast-nozzle entering the said cone-chamber, a pipe connecting the same with a suitable blower, a series of nozzles or pipes entering the enlarged end of the cone-chamber and connected with the supply-pipe, valves for controlling the pipe-nozzles, and a hopper for delivering the finely-ground material into the cone-chamber at a point to the rear of the open ends of said nozzles, the structure being such that a high or low blast may be caused to pass through the cone-chamber, the air thus forced through the same being more or less moistened when it is desired to hydrate the cement, substantially as described.

In testimony whereof I hereunto affix my signature in presence of two witnesses.

WILLIAM R. DUNN.

Witnesses:
WM. HENRY WALTERS,
CHAS. B. BRUNNER.